Feb. 28, 1939.                W. E. McFARLAND, JR                2,148,827
            APPARATUS FOR THE MANUFACTURE OF DECOLORIZING CARBON
                                Filed Oct. 11, 1935
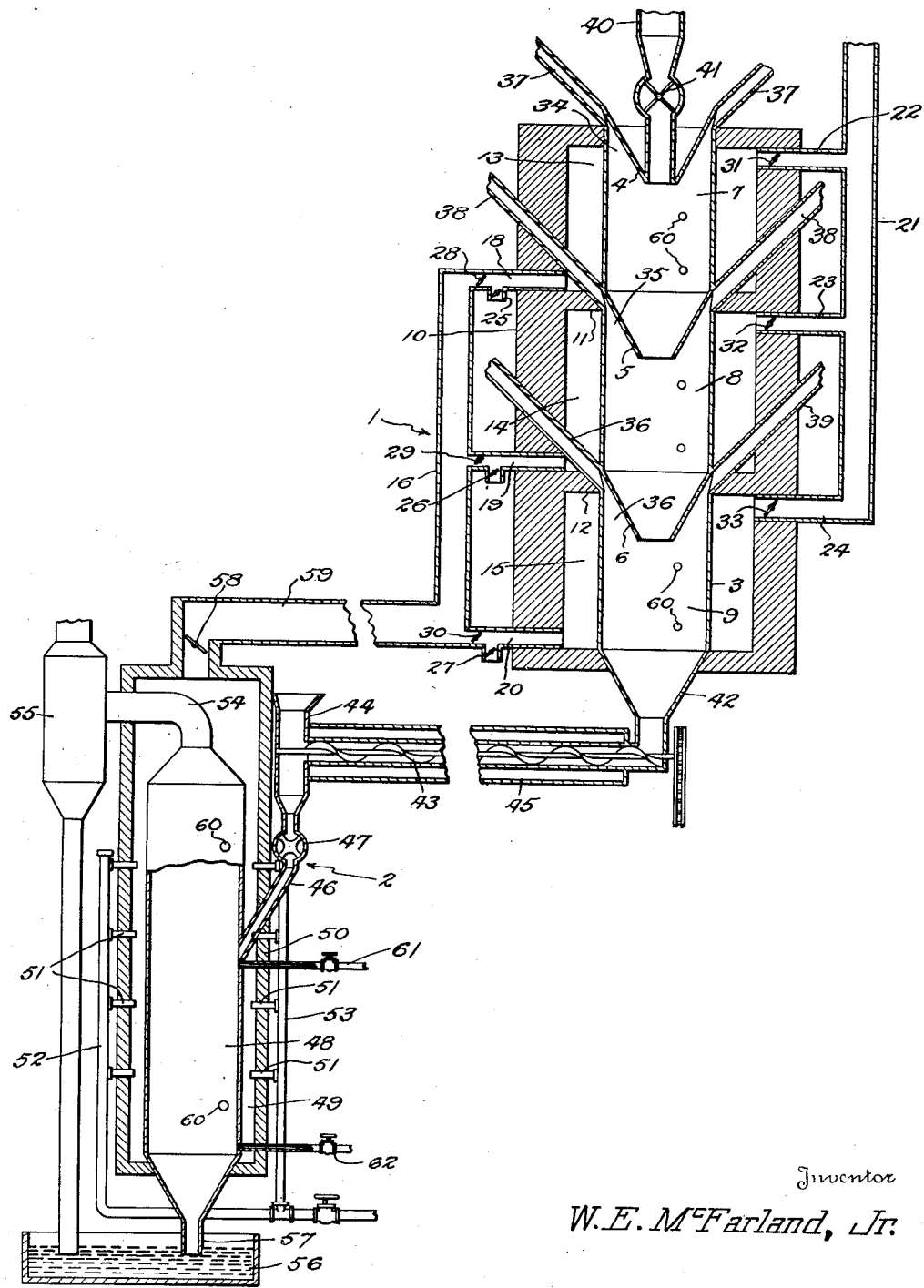
Inventor
W. E. McFarland, Jr.
By Mason Fenwick & Lawrence
                        Attorneys Patented Feb. 28, 1939

2,148,827

UNITED STATES PATENT OFFICE 2,148,827

APPARATUS FOR THE MANUFACTURE OF DECOLORIZING CARBON

William E. McFarland, Jr., Reserve, La., assignor to Godchaux Sugars, Inc., New Orleans, La.

Application October 11, 1935, Serial No. 44,627

4 Claims. (Cl. 202—114)

This invention relates to processes of and apparatus for making activated carbon, and for reactivating spent activated carbon.

The main process involved is adapted for the preparation of a highly active carbon from a variety of raw vegetable materials, ranging from cane bagasse to lignite. Parts of the aforesaid main process are designed for use in reactivating spent activated carbons, and for the recovery of various by-products of destructive distillation during the preparation of the primary carbon used in the manufacture of the activated carbon.

The main object of the invention is to provide an economical continuous process and apparatus for the production of primary char and the activation thereof; and for the recovery of by-products resulting from the distinctive distillation of the materials used in the manufacture of the product.

Other objects of the invention will become apparent as the detailed description thereof proceeds.

The drawing is a fragmentary diagrammatic lay-out of the apparatus used to practice the invention; some of the parts being illustrated in side elevation, and others in vertical section.

As shown in the drawing, the apparatus comprises a primary carbon kiln designated generally by the reference numeral 1, and a secondary or activating kiln designated generally by the reference numeral 2. The primary kiln comprises a retort 3 divided by conical baffles 4, 5, and 6 into the reaction chambers 7, 8, and 9, respectively.

The retort 3 is heated by hot gases introduced into a furnace 10 of refractory material having the retort centrally located therein. The furnace is divided by partitions 11 and 12 into chambers 13, 14 and 15 surrounding the retort chambers 7, 8, and 9, respectively. Hot gases from the secondary kiln are conducted from a manifold 16 through the pipes 18, 19 and 20 into the chambers 13, 14, and 15, respectively; and out of these chambers to an exhaust flue 21 through the pipes 22, 23, and 24, respectively.

The pipes 18, 19, and 20 are provided with damper-controlled air inlets 25, 26, and 27, respectively; and dampers 28, 29, and 30 control the flow of gases from the manifold 16 through the pipes 18, 19, and 20 into the chambers 13, 14, and 15. Dampers 31, 32, and 33 control the exit of the gases from the said chambers 13, 14, and 15 to the exhaust outlets and flue 21.

The conical baffles 4, 5, and 6 provide pockets 34, 35, and 36 to trap the by-product gases resulting from the destructive distillation of the char material in the chambers 7, 8, and 9; and pipes 37, 38, and 39 extend from the upper ends of these respective pockets to conduct these by-products to any suitable collectors. It will be understood, of course, that the different temperatures of the chambers 13, 14, and 15 will be controlled by adjustment of the dampers to effect separation of these by-products as the char material passes progressively downward through the several chambers in the retort.

The bagasse or other material is fed from a storage hopper 40 through a feeder 41 into the upper end of the retort 3; and the primary char is discharged through the outlet hopper 42 at the lower end of the retort into a water jacketed scroll conveyor 43, shown in the drawing as connected to the inlet storage bin 44 of the secondary kiln 2. The primary carbon in the conveyor 43 is cooled by the water jacket 45, so that it will not oxidize when it comes in contact with the air; and is preferably ground or pulverized, when desired, to a certain grist by any suitable means (not shown) before being fed into the secondary activating kiln 2.

The storage bin 44 may be used to receive primary char from the conveyor 43 for activation in the kiln 2; or, may receive spent carbon to be reactivated in the said kiln 2. A pipe 46 conducts the carbon to be activated, or spent carbon to be reactivated, from the bin 44 to the retort 48 encased in the chamber 49 by the casing 50 of refractory material.

As shown in the drawing, the furnace chamber 49 is heated through the gas burners 51 connected through the manifolds 52 and 53 to a suitable source of supply. The upper end of the retort 48 is connected by a pipe 54 to any suitable separator 55 having its lower end water sealed in a tank 56, which also forms a water seal for the discharge end 57 of the retort.

A damper 58 at the upper end of the chamber 49 controls the passage of the hot gases from the chamber 49, through the pipe 59 connected to the manifold 16 of the primary kiln. Pyrometers 60 are arranged in the various chambers of the retort 3 and at the upper and lower ends of the retort 48 to indicate the temperatures and enable the operator to adjust the dampers accordingly.

A valve-controlled inlet 61 is connected to the retort 48 near the center thereof to control the admission of air or a mild oxidizing agent. A similar valve controlled inlet 62 is connected to the retort 48, near the bottom thereof, to control the admission of superheated steam into the lower part of the retort.

In carrying out this process, the kiln 2 is intended to be heated externally or internally, 750° C. to 1200° C. or by the heat of exothermic reaction in the activation of the carbon. The bagasse or other vegetable matter as it moves downwardly through the retort 3, is deprived, at its various stages of descent, of acetic acid, methanol, tar and non-condensable gases which may be used as a fuel.

The bagasse converted to primary char is removed and cooled by the conveyor 43; and, when necessary, is ground to a predetermined grist before being fed to the storage bin connected to the secondary or activating kiln.

In the old methods of preparing activated char from cane bagasse, the primary carbon is washed with an acid solution before activation. By the present method, it is not necessary to wash the primary carbon with acid, since a highly activated carbon can be made directly from the primary char. In the old method too, the whole body of primary carbon is subjected to the same process of activation; that is, it is subjected to the same temperature and the same activating agents during its progress through the activating kiln or retort. I have found that in the activation of a primary carbon, or in the reactivation of spent activated carbon, different density granules of the same carbon and of the same size require different degrees of activation. The light density granules require less activation because they contain less impurities to be removed. Since the heavier particles contain more impurities, these require a severe activation.

In the ordinary methods of activation, the fact that the light and heavy density particles require different treatment, is overlooked. The yield of activated carbon is thereby greatly reduced, due to the fact that a great percentage of the light density particles are burned up and ashed because of their being subjected to the same treatment as the heavy particles.

In this process, the light density particles are treated with air or some mild oxidizing agent and heat; and the activated carbon resulting from this treatment, is removed from the reactivating retort or chamber 48. The heavy density particles remain in the chamber and are given a more severe activation by subjecting them to the action of air or a mild oxidizing agent, heat and steam. The heavy density particles also remain in the reaction chamber longer, in order to ensure complete removal of the impurities.

The location of the inlet pipe 46 into the retort 48 will be different for different materials to be activated. The height of the inlet 46 depends upon the material the retort is used to activate, since the location of the inlet partly determines the time the light and heavy particles remain in the activating retort. The nearer this feed inlet is to the top of the retort, the shorter will be the time the light particles remain in the retort, and the longer the time the heavy particles remain therein. This, of course, is due to the distance these particles must travel before they are removed from the retort.

The heavier particles remain in the activating retort longer because of the fact that the upward current of activating gases retard the fall of these particles. The higher the upward velocity of the activating gases, the longer it takes these heavy particles to fall to the bottom of the retort, and the shorter time it takes the light particles to be carried out to the separator where they are separated from the reaction gases. It is necessary to keep the heavier particles longer in the activating chamber because they contain more impurities and are, therefore, more difficult to activate.

After treatment of the light particles by air or a mild oxidizing agent admitted through the pipe 61, the activated light particles are carried over into the separator 55, by the current of air or oxidizing agent where they are separated from the reaction gases and the carbon falls into the water sealed tank 56. The heavier particles after activation by the superheated steam through the pipe 62, are discharged through the lower end 57 of the retort 48 into the water sealed tank 56, which may be provided with a partition to separate the light and heavy density particles of reactivated carbon. Of course, the omission of the partition will permit both light and heavy density particles to be mixed.

The activated carbon after leaving the activating retort, may be washed thoroughly with water, or it may be washed with acid. If it be washed with acid, it should be washed afterwards, with water, until the carbon is neutral or slightly acid, if it is to be used for decolorizing sugar solution.

While the apparatus is shown as including three sections or chambers in the primary kiln, it is to be understood that the invention is not to be considered as limited to the use of any particular number of such chambers. The temperatures of the various sections increase progressively downward; and the pyrometers 60 may be replaced by thermostats for automatically controlling the setting of the various dampers to maintain the temperatures of the various sections within predetermined limits. It will also be understood that the various outlets for the by-products from the upper end of each chamber in the primary kiln, will be connected to suitable condensers for the recovery of the products of distillation.

What I claim is:

1. Apparatus for activating primary char and reactivating spent activated carbon comprising a substantially vertical retort, a furnace encasing said retort, means for heating said furnace, a tank containing a sealing liquid arranged below said retort, a separator for reaction gases and carbon connected to the upper end of said retort and having a discharge pipe for solids extending below the level of sealing liquid in said tank, the lower end of said retort also extending into said tank below the liquid level therein, and valve controlled means for introducing treating material into said retort.

2. Apparatus for activating primary char and reactivating spent activated carbon comprising a substantially vertical retort, a furnace encasing said retort, means for heating said furnace, a tank containing a sealing liquid arranged below said retort, a separator for reaction gases and carbon connected to the upper end of said retort and having a discharge pipe for solids extending below the level of sealing liquid in said tank, the lower end of said retort also extending into said tank below the liquid level therein, valve controlled means for introducing treating material into said retort, and means in said tank for separating the activated particles received from the separator and retort.

3. In apparatus for manufacturing decolorizing carbon from vegetable matter, a primary kiln comprising a substantially vertical retort, an inlet at the upper end of said retort, an outlet at the lower end thereof, means for dividing said retort into substantially vertical coaxial chambers communicating with each other, a furnace enclosing said retort and having substantially horizontal partitions dividing said furnace into sections surrounding said chamber, means for heating said furnace, means for controlling temperatures in said sections, means for removing the gases in each of said chambers resulting from the action of heat on the material therein, a second vertical retort, means for conducting material from said outlet to said second retort, means for heating said second retort, and means for conducting exhaust heat from the last named heating means to the said primary kiln.

4. The combination with the apparatus set forth in claim 3, of a tank containing a sealing liquid arranged below the second retort, a separator for reaction gases and carbon connected to the upper end of said second retort and having a discharge pipe for solids extending below the level of the sealing liquid in said tank, the lower end of said second retort also extending into said tank below the liquid level therein, and means in said tank for separating material received from said discharge pipe and the second retort.

WILLIAM E. McFARLAND, Jr.